(12) United States Patent
Chatelain et al.

(10) Patent No.: US 9,700,036 B1
(45) Date of Patent: Jul. 11, 2017

(54) DUCK DECOY DEVICE

(71) Applicants: Justin P. Chatelain, Cottonport, LA (US); Kirk Juneau, Plaucheville, LA (US)

(72) Inventors: Justin P. Chatelain, Cottonport, LA (US); Kirk Juneau, Plaucheville, LA (US)

( * ) Notice: Subject to any disclaimer, the term of this patent is extended or adjusted under 35 U.S.C. 154(b) by 103 days.

(21) Appl. No.: 14/681,621

(22) Filed: Apr. 8, 2015

(51) Int. Cl.
*A01M 31/06* (2006.01)
*A01M 31/00* (2006.01)
*A01M 99/00* (2006.01)

(52) U.S. Cl.
CPC ............ *A01M 31/06* (2013.01); *A01M 31/00* (2013.01); *A01M 99/00* (2013.01)

(58) Field of Classification Search
CPC .............................. A01M 31/00; A01M 31/06
USPC ................................................................ 43/3
See application file for complete search history.

(56) References Cited

U.S. PATENT DOCUMENTS

| | | | | |
|---|---|---|---|---|
| 2,539,727 A * | 1/1951 | Clark | ..................... | A01M 31/06 43/3 |
| 2,678,778 A * | 5/1954 | Gibson | ................. | A01M 31/06 43/3 |
| 4,056,890 A * | 11/1977 | Dembski | ............... | A01M 31/06 43/3 |
| 4,612,722 A * | 9/1986 | Ferrell | ................... | A01M 31/06 43/26.1 |
| 4,757,630 A * | 7/1988 | Torberg | ................ | A01M 31/06 43/3 |
| 5,367,813 A * | 11/1994 | Cherry | .................. | A01M 31/06 43/2 |
| 6,487,811 B2 * | 12/2002 | Barrett | .................. | A01M 31/06 43/3 |
| 7,117,628 B1 * | 10/2006 | Bailey | ................... | A01M 31/06 43/3 |
| 9,386,765 B1 * | 7/2016 | Chatelain | .............. | A01M 31/06 |
| 2003/0173445 A1 * | 9/2003 | Lebens | ................ | B65H 75/406 242/385.4 |
| 2008/0155879 A1 * | 7/2008 | Whipple | ............... | A01M 31/06 43/3 |
| 2013/0014423 A1 * | 1/2013 | Tonkovich | ............ | A01M 31/06 43/3 |

* cited by examiner

*Primary Examiner* — Marc Burgess
*Assistant Examiner* — Morgan T Barlow
(74) *Attorney, Agent, or Firm* — Stevenson IP, LLC

(57) ABSTRACT

A duck decoy device with a hollow body joined to a base with an interior u-shaped housing. An insert has a platform capable of partial disassembly. The platform has a left half and a right half that are selectively divisible. The platform also has a front platform and a rear platform that are pivotal and divisible. A collar selectively joins the left half to the right half. A spool with line is removably contained between a pair of stilted arches, one of each stilted arch disposed on each of the left half and the right half. The stilted arches are selectively disposed within the u-shaped housing. A weight with surrounding shell is selectively held and alternately released from the insert, and is fastened to the insert via the line. The insert provides for the decoy to be serviceable and to have various parts repaired and replaced.

3 Claims, 5 Drawing Sheets

DUCK DECOY DEVICE

BACKGROUND OF THE INVENTION

Of the various types of duck decoy device known in the prior art, none offer the advantages of the present duck decoy device. A decoy has been need that is modular, such that a plurality of components is serviceable and replaceable. A decoy has been needed that offers an anchoring weight fastened to the decoy via a reeled flexible line, such as a fishing line. A self-retracting reel is also advantageous, as is a ratcheting reel. Durability and ease of use are also desirable. The present device provides such needed features.

FIELD OF THE INVENTION

The present duck decoy device relates to duck decoys.

SUMMARY OF THE INVENTION

The general purpose of the duck decoy device, described subsequently in greater detail, is to provide a duck decoy device that has many novel features that result in a duck decoy device which is not anticipated, rendered obvious, suggested, or even implied by prior art, either alone or in combination thereof.

To accomplish this, the duck decoy device partially comprises a hollow body. The hollow body has a head end and a tail end spaced apart from the head end, and a top side and a bottom side spaced apart from the top side. A ring is disposed in the tail end top side. An elliptical base is affixed within the bottom side. The base has an upper side and a lower side spaced apart from the upper side. A peripheral lip is affixed to the upper side. A longitudinal rib is disposed centrally on the upper side. The longitudinal rib substantially extending from proximal the head end to the tail end. A plurality of spaced apart lateral ribs is disposed on the upper side. The lateral ribs intersect the longitudinal rib. The ribs provide added structural integrity to the base.

A u-shaped housing is disposed on the upper side. The u-shaped housing has a first side spaced apart from a second side. An opening is disposed through the upper side and the lower side, proximal the head end. A beveled entry is disposed between the opening and the upper side and the lower side. A mirror image laterally protruded indent is disposed within each of the first side and the second side.

An insert is removably inserted into the base. The insert has a superior side and an inferior side spaced apart from the superior side. The insert has a front platform removably affixed to a pear-shaped rear platform.

The front platform has a selectively joined left half and right half, a front side and a rear side spaced apart from the front side. The superior side of each of the left half and the right half has a stilted arch with a flexible ear disposed within the stilted arch. A detent is disposed upwardly within the flexible ear. Each detent is selectively fitted into one of the indents of the first side and the second side, respectively. The beveled entry aids in insertion of the detents into the u-shaped housing. A half moon receiver is disposed longitudinally on the superior side adjacent the rear side of each of the left half and the right half. A slot is disposed in the receiver at the rear side. A depression is disposed within the slot. A plurality of spaced apart spacers is disposed on the front platform inferior side.

A parallelepiped shaft half is extended longitudinally from each of the left half and the right half superior side rear side. An axle is extended laterally from the right half stilted arch to the left half stilted arch. An orifice is disposed within the left half stilted arch. The orifice removably receives the axle. A spool is removably disposed on the axle. The spool is selectively provided as a ratcheting spool. A ratcheting self-retracting spool is selectively provided. Such spools are known in the art. A flexible line is disposed on the spool. The front platform inferior side has a plurality of spaced apart laterally disposed spacers. An inwardly open cusp-like half arc is disposed on the front side and extended downwardly there from.

The pear-shaped rear platform has a bottom portion and a neck portion affixed to the bottom portion. The rear platform has a centrally disposed parallelepiped shaft. A collar is slidingly disposed on the parallelepiped shaft. A slide of the collar toward the front platform is configured to selectively receive the parallelepiped shaft half of each of the left half and the right half and join the left half to the right half. When the collar is slid toward the rear end of the body, the collar will release the left half from the right half. A release of the left half from the right half is configured to release the self-retracting spool from the axle.

A pair of spaced apart arms is disposed on the rear platform and extended toward the front platform. A projection is disposed medially on each arm of the pair of arms. One of each projection is removably and pivotally fitted within one of the depressions, respectively. A finger pull is disposed on the neck portion inferior side.

A cusp-like half arc is disposed on the front platform front side and extended downwardly there from. A cusp-like partial arc is disposed on the rear platform rear side and extended downwardly away from the rear platform. An elliptical sinker has a shell and a weight disposed within the shell. The sinker abuts the spacers when confined in place between the cusp-like half arc and the cusp-like partial arc. A foramen is disposed in the elliptical sinker proximal to ratcheting spool. The foramen is configured to provide for selectively securing the line to the sinker. After the line is passed through the foramen, an object may be tied to the line to prevent retreat through the foramen. The elliptical sinker is configured to be held within the cusp-like half arc and the cusp-like partial arc. The elliptical sinker is configured to be released from the cusp-like partial arc by a pull of the finger pull toward the duck body. The cusp-like half arc is configured to release the sinker upon a release of the sinker from the cusp-like partial arc and also by an upward pivot of the rear platform.

Thus has been broadly outlined the more important features of the present duck decoy device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
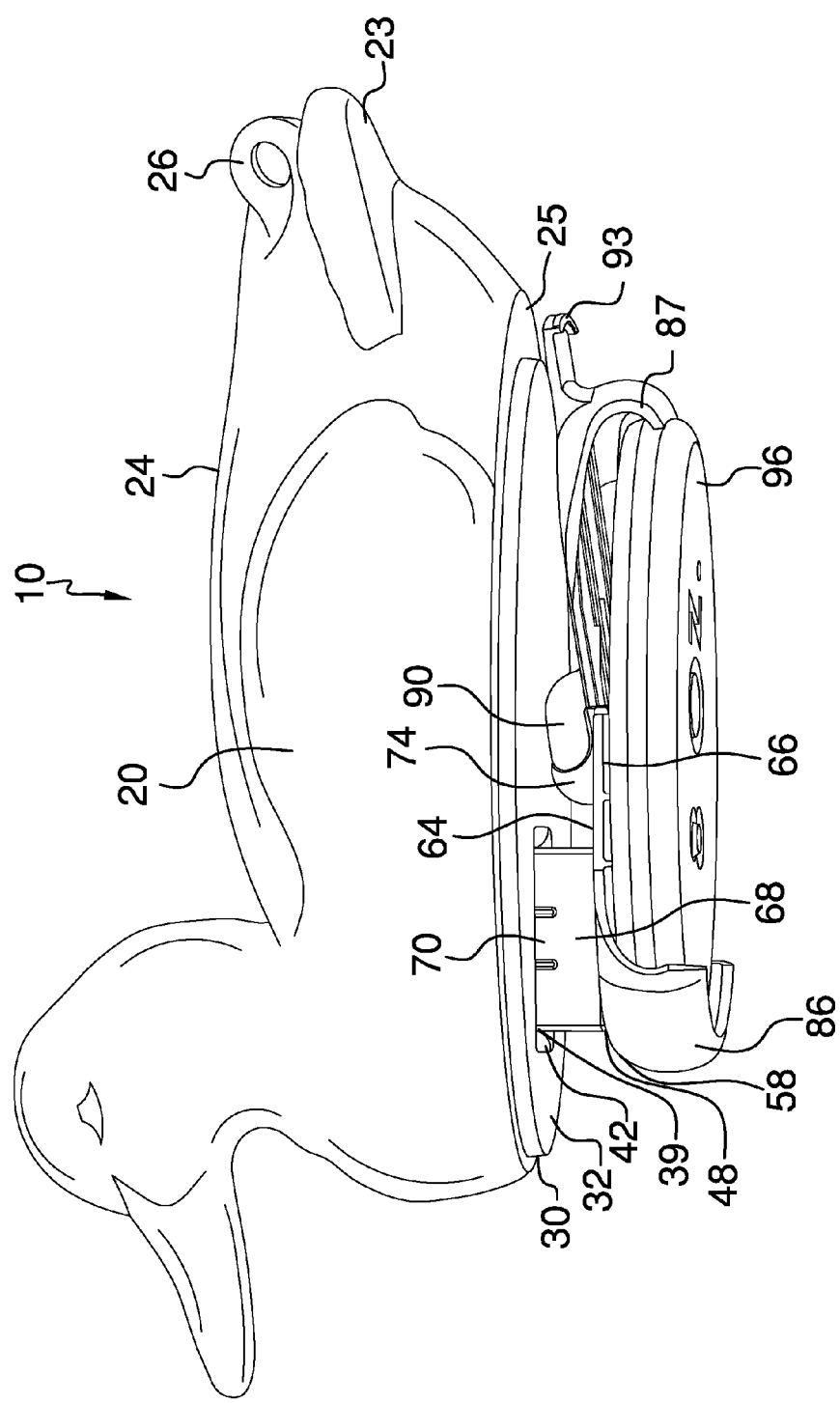
FIG. 1 is a bottom side perspective view.
Figure 2:
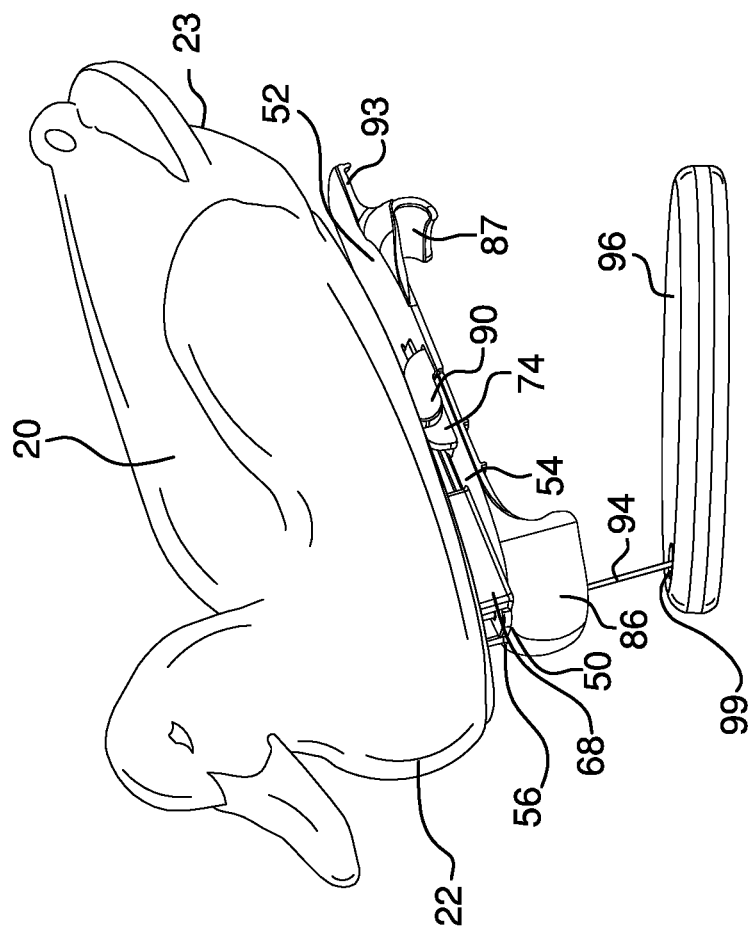
FIG. 2 is a front end perspective view.
Figure 3:
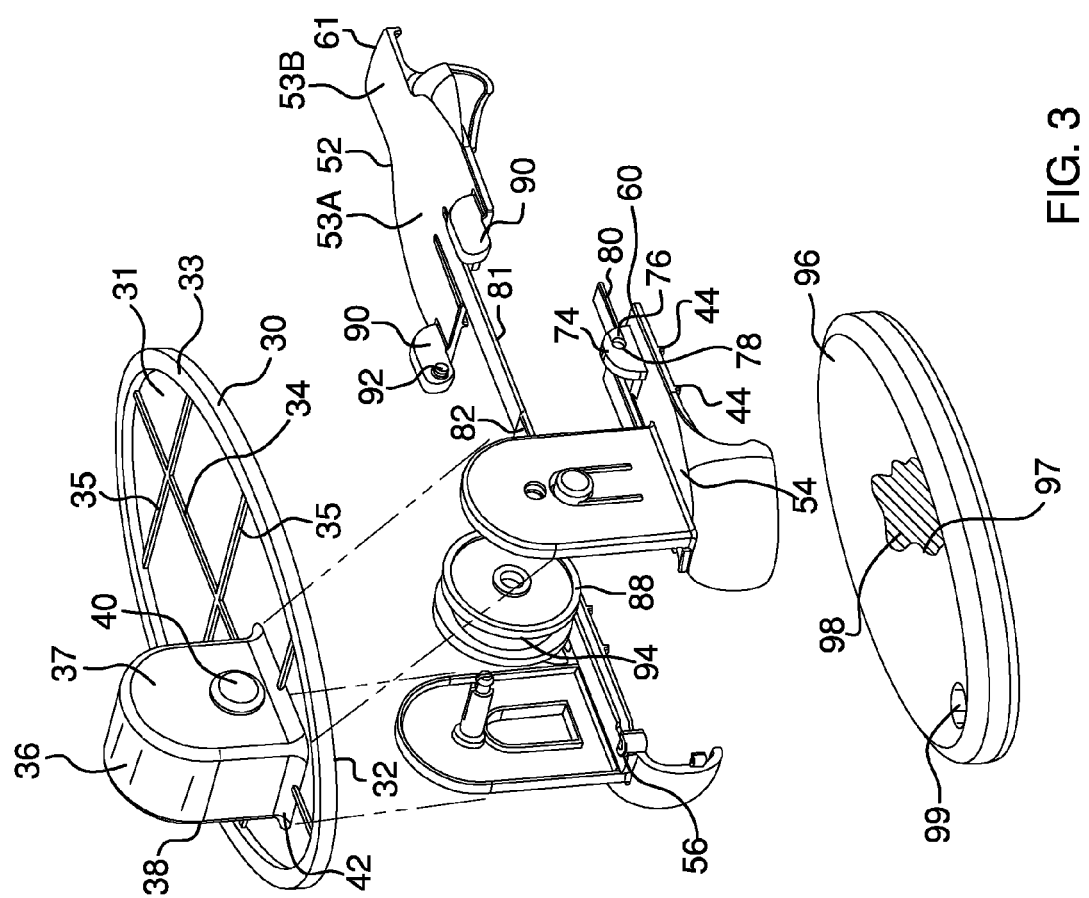
FIG. 3 is an exploded view of the insert.
Figure 4:
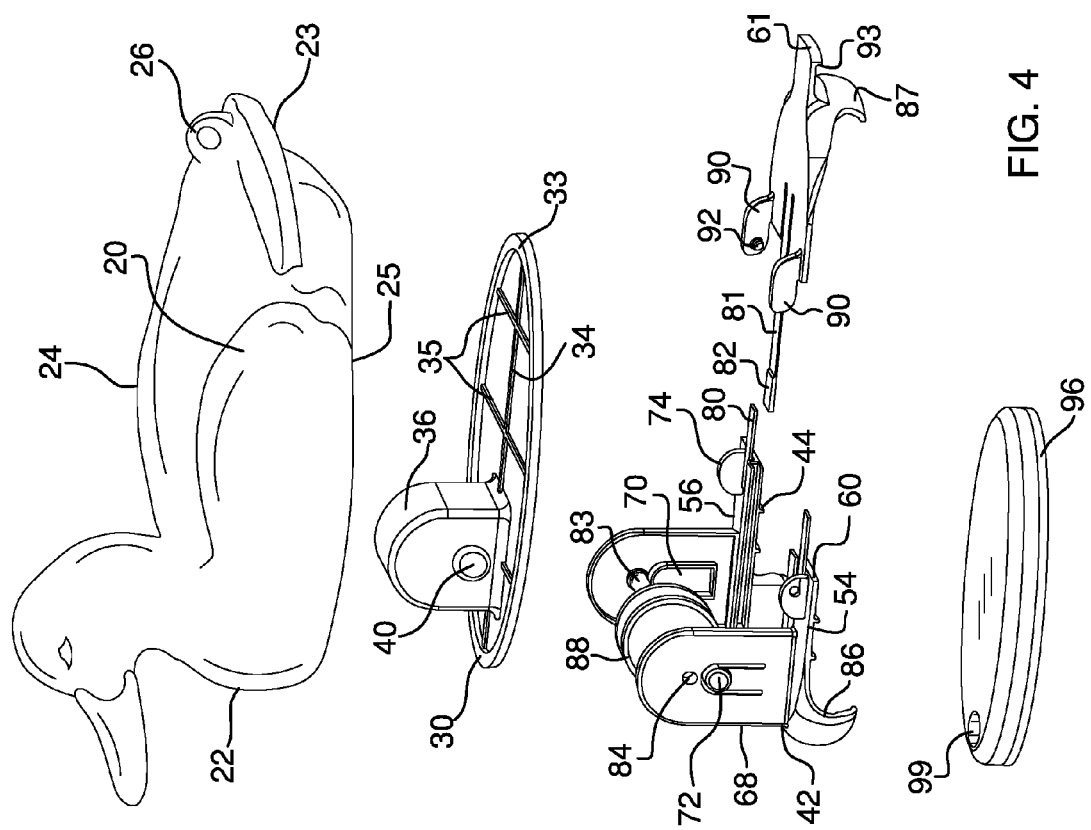
FIG. 4 is an exploded view.
Figure 5:
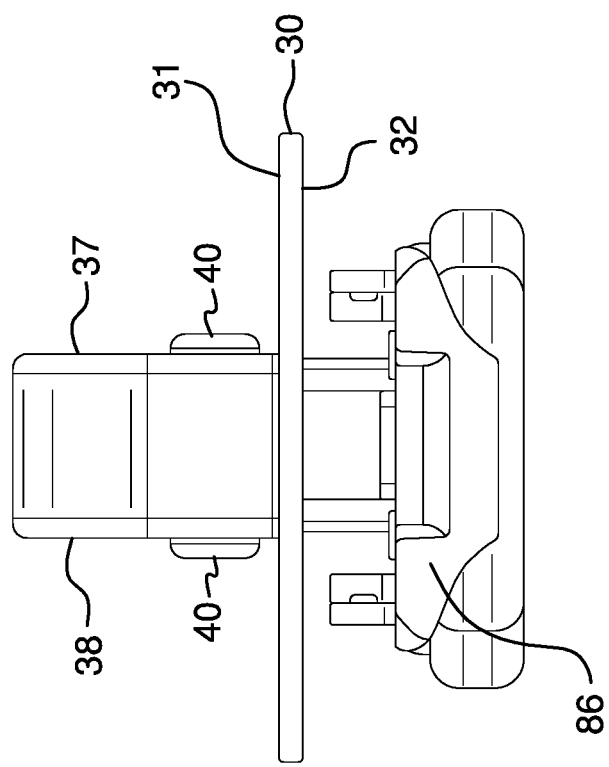
FIG. 5 is a front elevation view of the insert in place.

With reference now to the drawings, and in particular FIGS. 1 through 5 thereof, an example of the duck decoy device employing the principles and concepts of the present duck decoy device and generally designated by the reference number 10 will be described.

Referring to FIGS. 1 through 5, the duck decoy device 10 partially comprises a hollow body 20. The hollow body 20 has a head end 22 and a tail end 23 spaced apart from the head end 22, and a top side 24 and a bottom side 25 spaced apart from the top side 24. A ring 26 is disposed in the top side 24 of the tail end 23. An elliptical base 30 is affixed within the bottom side 25, wherein the body 20 and the base 30 are watertight. The base 30 has an upper side 31 and a lower side 32 spaced apart from the upper side 31. A peripheral lip 33 is affixed to the upper side 31. A longitudinal rib 34 is disposed centrally on the upper side 31. The longitudinal rib 34 substantially extends from proximal the head end 22 to the tail end 23. A plurality of spaced apart lateral ribs 35 is disposed on the upper side 31. The lateral ribs 35 intersect the longitudinal rib 34.

A u-shaped housing 36 is disposed on the upper side 31. The u-shaped housing 36 has a first side 37 spaced apart from a second side 38. An opening 39 is disposed through the upper side 31 and the lower side 32. A beveled entry 42 is disposed between the opening 39 and the upper side 31 and the lower side 32. A mirror image laterally protruded indent 40 is disposed within each of the first side 37 and the second side 38.

An insert 48 is removably inserted into the base 30. The insert 48 has a superior side 64 and an inferior side 66 spaced apart from the superior side 64. The insert 48 has a front platform 50 removably affixed to a pear-shaped rear platform 52. The front platform 50 has a selectively joined left half 54 and right half 56 and a front side 58 and a rear side 60 spaced apart from the front side 58. The superior side 64 of each of the left half 54 and the right half 56 has a stilted arch 68 with a flexible ear 70 disposed within the stilted arch 68. A detent 72 is disposed upwardly within the flexible ear 70. Each detent 72 is selectively fitted into one of the indents 40, respectively. A half moon receiver 74 is disposed longitudinally on the superior side 64 adjacent the rear side 60 of each of the left half 54 and the right half 56. A slot 76 is disposed laterally in the receiver 74 at the rear side. A depression 78 is disposed within the slot 76. A plurality of spaced apart spacers 44 is disposed on the front platform 50 inferior side 66.

A parallelepiped shaft half 80 is extended longitudinally from each of the left half 54 and the right half 56 of the superior 64 side rear side 60. An axle 83 is extended laterally from the right half 56 stilted arch 68 to the left half 54 stilted arch 68. An orifice 84 is disposed within the left half 54 stilted arch 68. The orifice 84 removably receives the axle 83. A spool 88 is removably disposed on the axle 83. A ratcheting self-retracting spool 88 is selectively provided. A flexible line 94 is disposed on the spool 88. An inwardly open cusp-like half arc 86 is disposed on the front side 58 and extended downwardly there from.

The pear-shaped rear platform 52 has a bottom portion 53A and a neck portion 53B affixed to the bottom portion 53A. The rear platform 52 has a centrally disposed parallelepiped shaft 81. A collar 82 is slidingly disposed on the parallelepiped shaft 81. A slide of the collar 82 toward the front platform 50 is configured to selectively receive the parallelepiped shaft half 80 of each of the left half 54 and the right half 56 and join the left half 54 to the right half 56. The slide of the collar 82 toward the rear platform 52 is configured to release the left half 54 from the right half 56. A release of the left half 54 from the right half 56 is configured to release the self-retracting spool 88 from the axle 83.

A pair of spaced apart arms 90 is disposed on the rear platform 52 and extended toward the front platform 50. A projection 92 is disposed medially on each arm 90 of the pair of arms 90. One of each projection 92 is removably and pivotally fitted within one of the depressions 78, respectively. A finger pull 93 is disposed on the neck portion 53B inferior side 66.

A cusp-like half arc 86 is disposed on the front platform 50 front side 58 and extended downwardly there from. A cusp-like partial arc 87 is disposed on the rear platform 52 rear side 61 and extended downwardly away there from. An elliptical sinker 96 has a shell 97 and a weight 98 disposed within the shell 97. An foramen 99 is disposed in the elliptical sinker 96 proximal to ratcheting spool 88. The foramen 99 is configured to provide for selectively securing the line 94 to the sinker 96. The elliptical sinker 96 is configured to be held within the cusp-like half arc 86 and the cusp-like partial arc 87. The sinker 96 is configured to be released from the cusp-like partial arc 87 by a pull of the finger pull 93 toward the duck body 20. The cusp-like half arc 86 is configured to release the sinker 96 upon a release of the sinker 96 from the cusp-like partial arc 87. The sinker 96 is also released by an upward pivot of the rear platform 52.

What is claimed is:

1. A duck decoy device comprising:
   a hollow body, the hollow body having a head end and a tail end spaced apart from the head end, a top side and a bottom side spaced apart from the top side;
   a ring disposed in the top side of the tail end;
   an elliptical base affixed within the bottom side, the base having an upper side and a lower side spaced apart from the upper side, wherein the base and hollow body are watertight;
   a peripheral lip affixed to the upper side;
   a longitudinal rib disposed centrally on the upper side, the longitudinal rib substantially extending from proximal the head end to the tail end;
   a plurality of spaced apart lateral ribs disposed on the upper side, the lateral ribs intersecting the longitudinal rib;
   a u-shaped housing disposed on the upper side, the u-shaped housing having a first side spaced apart from a second side, an opening disposed through the upper side and the lower side, a beveled entry disposed between the opening and the lower side;
   a mirror image laterally protruded indent disposed within each of the first side and the second side;
   an insert removably inserted into the base, the insert having a superior side and an inferior side spaced apart from the superior side;
   the insert having a front platform removably affixed to a pear-shaped rear platform, the front platform having:
   a selectively joined left half and right half, a front side and a rear side spaced apart from the front side, the superior side of each of the left half and the right half having;
   a stilted arch;
   a flexible ear disposed in the stilted arch;
   a detent disposed upwardly within the flexible ear, each detent selectively fitted into one of the indents, respectively;
   wherein the detents and indents are configured to selectively retain the insert within the base;
   a half moon receiver disposed longitudinally adjacent the rear side;
   a slot disposed in the receiver at the rear side;
   a depression disposed within the slot;

a plurality of spaced apart spacers disposed on the front platform inferior side;
a parallelepiped shaft half extended longitudinally from each of the left side and the right side of the rear side;
an axle extended laterally from the right half stilted arch to the left half stilted arch;
an orifice disposed within the left half stilted arch, the orifice removably receiving the axle;
a self-ratcheting spool removably disposed on the axle;
a flexible line disposed on the spool;
the insert front platform bottom side having:
  an inwardly open cusp-like half arc disposed on the front side and extended downwardly away from the front platform;
the pear-shaped rear platform having a bottom portion and a neck portion affixed to the bottom portion, the rear platform having:
  a centrally disposed parallelepiped shaft;
  a collar slidingly disposed on the parallelepiped shaft, wherein when the collar is slid toward the front platform the collar will selectively receive the parallelepiped shaft half of each of the left half and the right half and join the left half to the right half;
  wherein when the collar is slid toward the rear platform the collar will release the left half from the right half;
  wherein a release of the left half from the right half is configured to release the self-retracting spool from the axle;
  a pair of spaced apart arms, the arms extended toward front platform;
  a projection disposed medially on each arm of the pair of arms, one of each projection removably and pivotally fitted within one of the depressions, respectively;
  a finger pull disposed on the neck portion inferior side;
a cusp-like half arc disposed on the front platform front side and extended downwardly therefrom;
a cusp-like partial arc disposed on the rear platform rear side and extended downwardly therefrom;
an elliptical sinker having a shell and a weight disposed within the shell; and
a foramen disposed in the elliptical sinker proximal to the self-ratcheting spool;
wherein the elliptical sinker is configured to be selectively held within the cusp-like half arc and the cusp-like partial arc;
wherein the elliptical sinker is configured to release from the cusp-like half arc upon a release from the cusp-like partial arc.

2. A duck decoy device comprising:
a hollow body, the hollow body having a head end and a tail end spaced apart from the head end, a top side and a bottom side spaced apart from the top side;
a ring disposed in the top side of the tail end;
an elliptical base affixed within the bottom side, the base having an upper side and a lower side spaced apart from the upper side, wherein the base and hollow body are watertight;
a peripheral lip affixed to the upper side;
a longitudinal rib disposed centrally on the upper side, the longitudinal rib substantially extending from proximal the head end to the tail end;
a plurality of spaced apart lateral ribs disposed on the upper side, the lateral ribs intersecting the longitudinal rib;
a u-shaped housing disposed on the upper side, the u-shaped housing having first side spaced apart from a second side, an opening disposed through the upper side and the lower side, a beveled entry disposed between the opening and the lower side;
a mirror image laterally protruded indent disposed within each of the first side and the second side;
an insert removably inserted into the base, the insert having a superior side and an inferior side spaced apart from the superior side; the insert having a front platform removably affixed to a pear-shaped rear platform, the front platform having:
  a selectively joined left half and right half, a front side and a rear side spaced apart from the front side, the superior side of each of the left half and the right half having;
  a stilted arch;
  a flexible ear disposed in the stilted arch;
  a detent disposed upwardly within the flexible ear, each detent selectively fitted into one of the indents, respectively;
  wherein the detents and indents are configured to selectively retain the insert within the base;
  a half moon receiver disposed longitudinally adjacent the rear side;
  a slot disposed in the receiver at the rear side;
  a depression disposed within the slot;
  a plurality of spaced apart spacers disposed on the front platform inferior side;
  a half parallelepiped shaft extended longitudinally from each of the left side and the right side of the rear side;
  an axle extended laterally from the right half stilted arch to the left half stilted arch;
  an orifice disposed within the left half stilted arch, the orifice removably receiving the axle;
  a self-ratcheting spool removably disposed on the axle;
  a flexible line disposed on the spool;
the insert front platform bottom side having:
  an inwardly open cusp-like half arc disposed on the front side and extended downwardly away from the front platform;
the pear-shaped rear platform having a bottom portion and a neck portion affixed to the bottom portion, the rear platform having:
  a centrally disposed parallelepiped shaft;
  a collar slidingly disposed on the parallelepiped shaft, wherein when the collar is slid toward the front-platform the collar will selectively receive the parallelepiped shaft half of each of the left half and the right half and join the-left half to the right half;
  wherein when the collar is slid toward the rear platform the collar will release the left half from the right half;
  wherein a release of the left half from the right half is configured to release the self-retracting spool from the axle;
  a pair of spaced apart arms, the arms extended toward front platform;
  a projection disposed medially on each arm of the pair of arms, one of each projection removably and pivotally fitted within one of the depressions, respectively;
  a finger pull disposed on the neck portion inferior side;
a cusp-like half arc disposed on the front platform front side and extended downwardly therefrom;

a cusp-like partial arc disposed on the rear platform rear side and extended downwardly therefrom;

an elliptical sinker having a shell and a weight disposed within the shell; and a foramen disposed in the elliptical sinker proximal to the self-ratcheting spool;

wherein the elliptical sinker is configured to be selectively held within the cusp-like half arc and the cusp-like partial arc;

wherein the elliptical sinker is configured to release from the cusp-like partial arc by a pull of the finger pull toward the duck body;

wherein the elliptical sinker is configured to release from the cusp-like partial arc by a rearward movement of the rear platform; and wherein the elliptical sinker is configured to release from the cusp-like half arc upon a release from the cusp-like partial arc.

3. The duck decoy device of claim 2 wherein the self-ratcheting spool is a self-retracting spool.

* * * * *